US009489532B2

(12) United States Patent
Nizami et al.

(10) Patent No.: US 9,489,532 B2
(45) Date of Patent: Nov. 8, 2016

(54) FAST ACCESS RIGHTS CHECKING OF CONFIGURED STRUCTURE DATA

(71) Applicant: Siemens Product Lifecycle Management Software Inc., Plano, TX (US)

(72) Inventors: Javeed Nizami, Plano, TX (US); Krishna Murthy Rao Terala, Milford, OH (US); Veeresh Oleti, Hyderabad (IN); Reiner K Kaiser, Redondo Beach, CA (US)

(73) Assignee: SIEMENS PRODUCT LIFECYCLE MANAGEMENT SOFTWARE INC., Plano, TX (US)

( * ) Notice: Subject to any disclaimer, the term of this patent is extended or adjusted under 35 U.S.C. 154(b) by 274 days.

(21) Appl. No.: 14/289,133

(22) Filed: May 28, 2014

(65) Prior Publication Data

US 2015/0347772 A1    Dec. 3, 2015

(51) Int. Cl.
*G06F 17/30* (2006.01)
*G06F 7/00* (2006.01)
*G06F 21/62* (2013.01)
*G06F 21/60* (2013.01)
*G06Q 10/08* (2012.01)

(52) U.S. Cl.
CPC ..... *G06F 21/6218* (2013.01); *G06F 17/30289* (2013.01); *G06F 17/30589* (2013.01); *G06F 17/30967* (2013.01); *G06F 21/604* (2013.01); *G06Q 10/0875* (2013.01)

(58) Field of Classification Search
CPC .................. G06F 17/30598; G06F 17/30705; G06F 17/30345; G06F 17/30339; G06F 17/30961; G06F 17/30997; G06F 21/6218; G06F 21/6227; G06F 2212/465; G06F 2221/2113; G06F 2221/2137
See application file for complete search history.

(56) References Cited

U.S. PATENT DOCUMENTS

| | | | |
|---|---|---|---|
| 7,610,312 B1* | 10/2009 | Topolovac | G06Q 10/0875 |
| 7,634,455 B1 | 12/2009 | Keene et al. | |
| 8,843,997 B1* | 9/2014 | Hare | H04L 63/0281 709/200 |
| 2003/0126195 A1* | 7/2003 | Reynolds | G06F 1/14 709/203 |
| 2003/0235211 A1* | 12/2003 | Thiru | H04L 69/329 370/469 |
| 2004/0162825 A1* | 8/2004 | Bhaghavan | G06F 17/30427 |
| 2005/0091346 A1* | 4/2005 | Krishnaswami | G06F 9/44505 709/220 |
| 2005/0246193 A1* | 11/2005 | Roever | G06Q 40/00 705/35 |
| 2007/0056019 A1 | 3/2007 | Allen et al. | |
| 2008/0077809 A1* | 3/2008 | Hayler | G06F 12/1466 713/193 |

(Continued)

FOREIGN PATENT DOCUMENTS

WO        98/55945 A1    12/1998

OTHER PUBLICATIONS

Communication From A Related Counterpart Application, PCT Application PCT/US2015/029171, International Search Report and Written Opinion dated Jul. 29, 2015, 11 pages.

*Primary Examiner* — Dung K Chau

(57) ABSTRACT

Methods for product data management and corresponding systems and computer-readable mediums. A method includes receiving a hierarchical data structure that includes a plurality of structure lines referencing persistent data objects and receiving metadata corresponding to persistent data objects referenced by the hierarchical data structure. The method includes computing an access control expression corresponding to each persistent object according to the metadata, wherein the access control expressions are string-representation Boolean expressions, and storing the access control expressions.

15 Claims, 3 Drawing Sheets

(56) References Cited

U.S. PATENT DOCUMENTS

2011/0252199 A1* 10/2011 Serrano ............... G06F 11/3476
　　　　　　　　　　　　　　　　　　　　711/118

2013/0227639 A1　　8/2013　Giambiagi et al.
2014/0012805 A1* 1/2014 Zoellner ............. G06F 17/3012
　　　　　　　　　　　　　　　　　　　　707/609

* cited by examiner

FAST ACCESS RIGHTS CHECKING OF CONFIGURED STRUCTURE DATA

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or PDM systems).

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums. A method includes receiving a hierarchical data structure that includes a plurality of structure lines referencing persistent data objects and receiving metadata corresponding to persistent data objects referenced by the hierarchical data structure. The method includes computing an access control expression corresponding to each persistent object according to the metadata, wherein the access control expressions are string-representation Boolean expressions, and storing the access control expressions.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
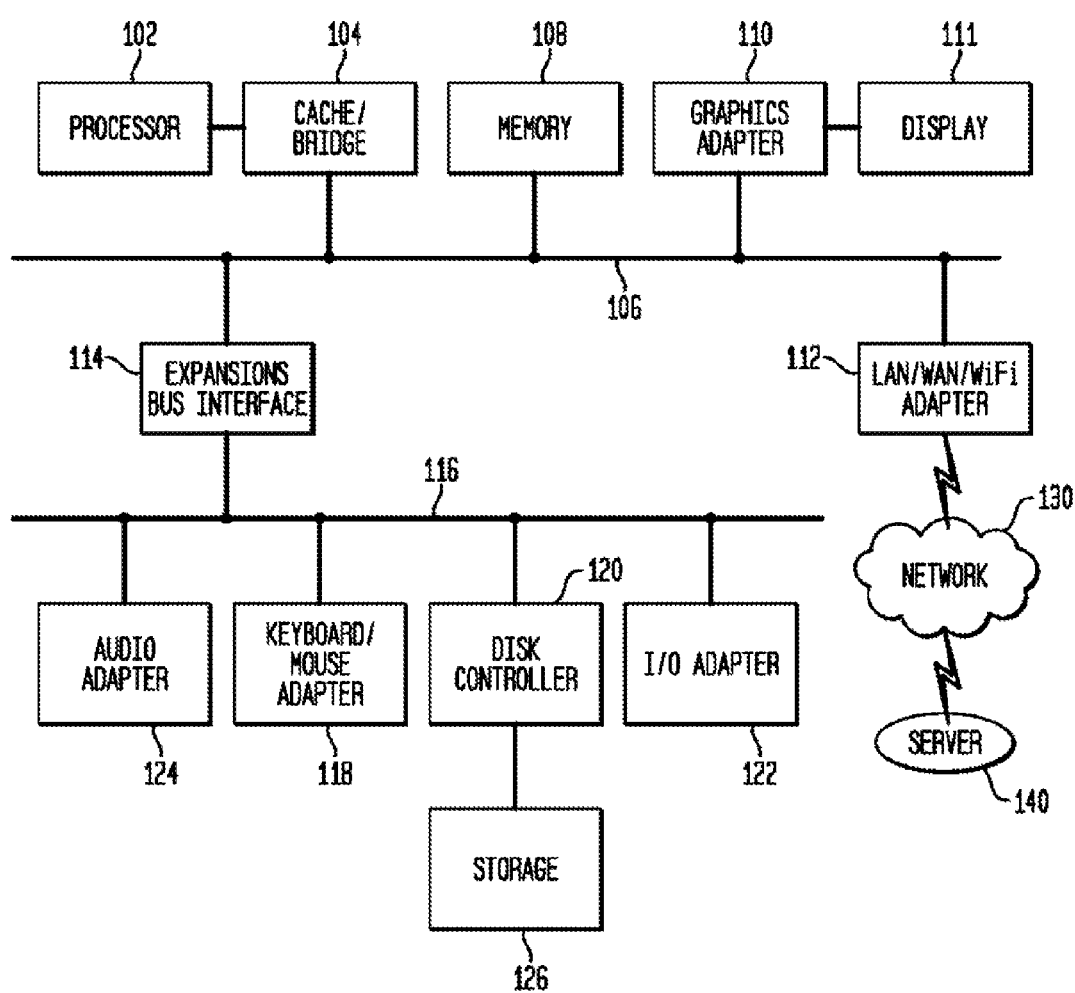
FIG. 1 illustrates a block diagram of a data processing system in which an embodiment can be implemented.
Figure 2:
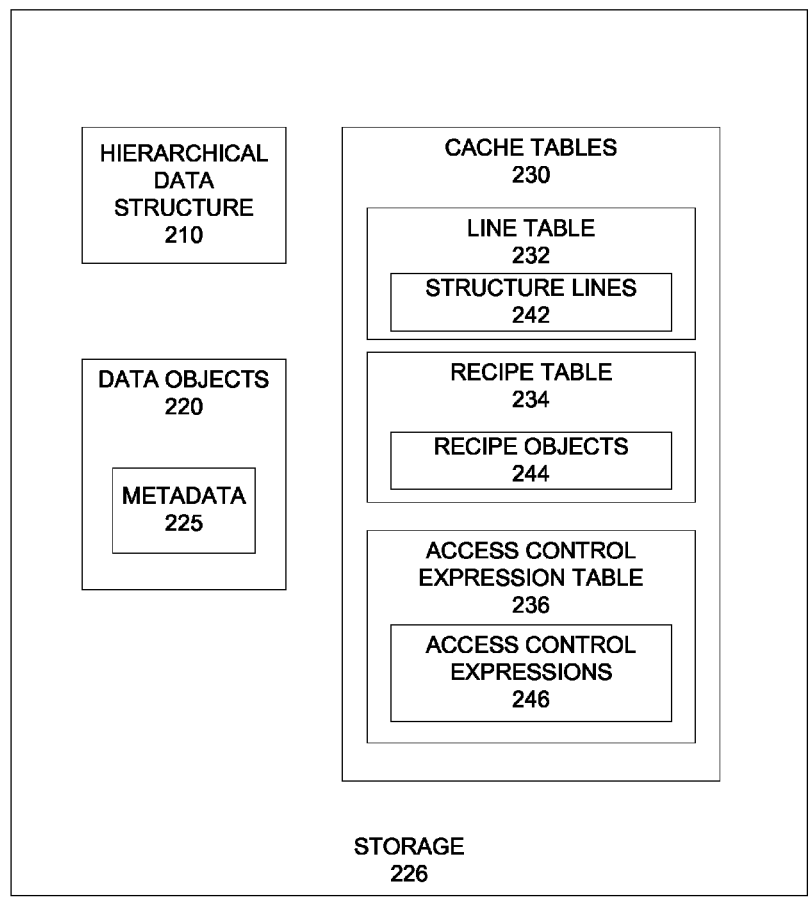
FIG. 2 illustrates data structures and elements that can be used in implementing disclosed embodiments.
Figure 3:
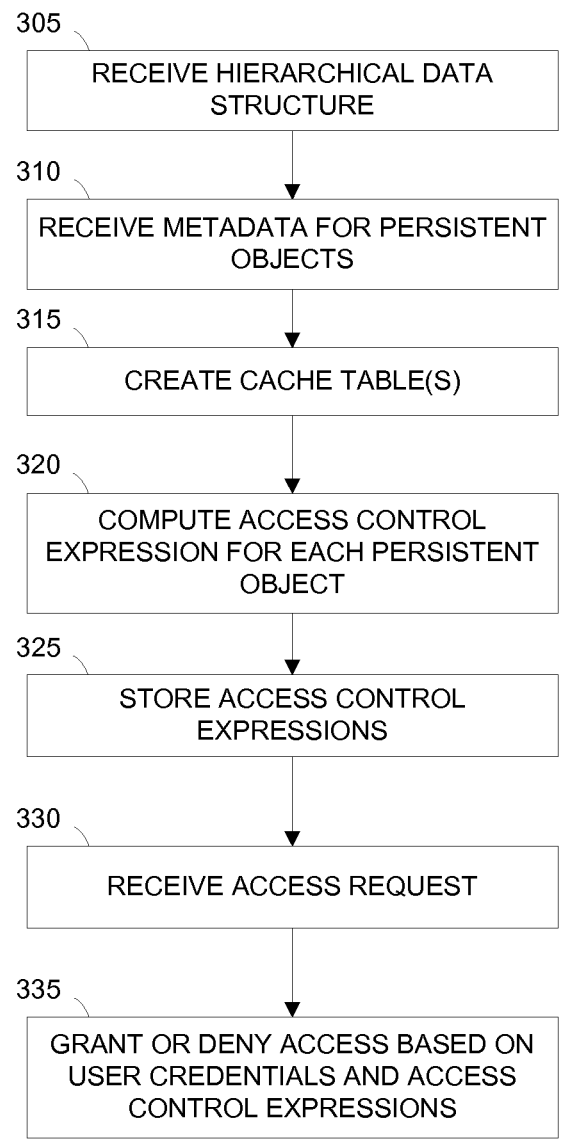
FIG. 3 illustrates a flowchart of a process in accordance with disclosed embodiments.

FIGS. 1 through 3, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

In the current PLM data exchange domain, more and more emphasis is placed on high performance and scalability of data retrieval and accessibility, especially when it comes to configured product structures such as a PDM bill of materials ("BOM"). A BOM structure can function as a hierarchical listing of all the raw materials, sub-assemblies, intermediate assemblies, sub-components, components, parts, quantities and other information necessary to produce a final product. A "BOM line" represents an exploded, configured instance of a part, assembly, other portion of the BOM, and a "structure line" refers to a similar representation for non-BOM embodiments. An assembly or part can be exploded and configured to produce a Bill-Of-Materials (BOM) tree of BOM lines. Explosion permutes the assembly/sub-assembly paths to produce the correct number of part lines for each part in the BOM tree and the correct number of assembly lines for each assembly in the BOM tree. The position of a line within the tree is given by the concatenation of transforms along the (single) path from a line to the root line. A configuration uses a configuration rule to determine which single part revision to use for a given part in the BOM tree, and which single assembly revision to use for a given assembly in the BOM tree.

Various algorithms can be used to access indexed product structure data at very high speeds, but in addition to fast retrieval of such BOM lines, the system should also validate whether or not the current user has the privilege to see all, parts or none of the information in that particular BOM line. Securing data and allowing access to only entities (users, software agents, etc.) that have proper privileges is a critical element of most enterprise software systems. Many systems, including product lifecycle products, define an access control list (ACL) as a list of permissions defined for an object. A robust security model in general contains a set of hierarchical rules, and precedence, that grant or deny access control, based on object state, meta definition, and the accessing entity's identity. In these systems, security of data is determined by rules and ACLs in combination with information about the user, such as group membership, project membership, nationality, geographic location which together determines the user's authorization to interact with data. In these systems, the rules are evaluated at run time every time access is allowed/denied.

Some algorithms achieve this by checking privileges of all persistent data objects which are a part of any properties, instantiated objects, or parent objects of a particular BOM line. Such an approach is not only very slow but is also not applicable when, for instance, retrieving data from an indexed structure where ad-hoc re-evaluation of BOM line properties is not an option.

Disclosed embodiments include improved systems and methods for efficiently performing access control functions when accessing structures such as BOM structures and others.

FIG. 1 illustrates a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Disclosed embodiments can efficiently perform access control functions when accessing structures such as BOM structures and others. In particular, disclosed processes can use pre-calculated recipes captured for all indexed information of BOM lines, such as child items, properties, and others, to perform set-based evaluation of property access. These processes can store and use individual read access privilege information for all relevant persistent data objects in the form of "access control expressions" which, when applied to a specific login user during a session, yield the read access privileges for that user. Disclosed processes allow for customization and configuration of performance optimizations such as caching of read expression string evaluation results per session and skipping of lines for which all recipe objects are fully accessible, which results in very high levels of performance.

Disclosed embodiments can use efficient computation and evaluation of read access rules persistent in a string representation, use set-based, generic logic, and maintain table caches for a given pre-configured and indexed BOM view.

FIG. 2 illustrates data structures and elements that can be used in implementing disclosed embodiments. Storage 226 represents a central or distributed data processing storage, which can be implemented in a combination of non-volatile and volatile storage mediums. In particular, some or all of storage 226 may be implemented in data processing system storage 126 or in data processing system memory 108, or in some combination of these.

Storage 226 stores a hierarchical data structure 210, which can be a BOM structure or other structure. In the specific embodiment described below, references to a BOM structure, BOM tree, or similar references are simply one implementation example of hierarchical data structure 210, which can represent any data so long as it can be accessed and processed as described herein.

Storage 226 also includes data objects 220, which can include the persistent data objects described below, that can be referred to by the hierarchical data structure 210, and metadata 225 that describes the data objects 220.

Storage 226 also includes one or more of the cache tables 230 described below. In specific embodiments, cache tables 230 can be stored in a faster, volatile memory, while the hierarchical data structure 210 and data objects 220 are stored in a non-volatile memory. These can include a Line Table 232 that includes a list of the structure lines 242, a Recipe Table 234 that includes a list of recipe objects 244 for each structure line 242, and an Access Control Expression Table 236 that includes the access control expressions 246 for the persistent data objects 220.

FIG. 3 depicts a flowchart of a process in accordance with disclosed embodiments that may be performed, for example, by one or more PLM or PDM systems as described herein, referred to generically as the "system" below.

The system receives a hierarchical data structure (305). "Receiving," as used herein, can include loading from storage, receiving from another device or process, receiving via an interaction with a user, or otherwise. The hierarchical data structure includes a plurality of structure lines that refer to persistent data objects; in some embodiments, this is implemented as hierarchical data structure 210, which is a BOM structure with BOM lines referring to persistent data objects 220.

Disclosed embodiments can perform efficient computation and evaluation of access control expressions persistent in a string representation (also referred to as "access read strings").

The system receives metadata corresponding to persistent data objects referenced by the hierarchical data structure (310).

The system creates at least one cache table for at least a portion of the hierarchical data structure (315). In some BOM-structure embodiments, the system creates three tables, all of which can be stored as cache tables 230:

A Line Table including the list of structure lines corresponding to the hierarchical data structure, which in specific embodiments are the BOM lines in a BOM structure:

| Line UID | Prop1 | Prop2 | ... | Prop_n – 1 | Prop_n |
| --- | --- | --- | --- | --- | --- |

A Recipe Table that includes the list of recipe objects for each structure line, which in specific embodiments are the BOM recipe objects for each BOM line. These recipe objects are the persistent data objects that are required as input in order to construct a structure line and its constituent properties in the Line Table:

| Line UID | Recipe_uid | Recipe_props |
| --- | --- | --- |
| Stable identity of BOMLine | Stable identity of recipe object (persistent) | List of properties containing this recipe object |

An Access Control Expression Table that includes the list of access control expressions, as described below, for all relevant persistent data objects of interest "OBJ_HASH" and "HASHED_READEXPR", respectively:

| UID | Object_hash |
| --- | --- |
| Stable identity of recipe object | Hashed read expression |
| Readexpr_hash | Readexpr_string |
| Hash | Full access control expression |

These tables can be partially populated during initial receipt, indexing, or generation of the hierarchical data structure, whether that is BOM structure or otherwise.

The system computes an access control expression corresponding to each persistent object according to the metadata (320). The access control rule for each persistent object is a Boolean expression and can be stored as a string representation. This can include computing access control expressions for each property of the persistent object.

The system computes access control expressions based on each object's metadata independent of end user authentication and authorization is performed by generating a Boolean expression. Object access is determined by evaluating the Boolean expression along with end user session information at runtime instead of re-evaluating the rules on each access. If the object state changes or the rules change then the Boolean expression is re-computed.

By avoiding rules computation on each access the performance is significantly improved. The pre-computation also allows for better evaluation algorithms by leveraging in-database solves vs. in memory computations, thus ultimately leading to the capability to provide secure accurate counts of objects which is not feasible with the current algorithms.

In a typical access control expression evaluation, according to various embodiments, the following three parameters play significant roles: object metadata, such as object type, object name, status, owning group, classification, domain, etc.; end user authentication and authorization, such as the end user's user id, group, role, domain, project, nationality, clearance level, etc.; and the precedence/placement of rules in an entire rule tree.

For example, consider a security system which allows definition of rules based on the object metadata, user authentication and authorization, and the system supports strict hierarchal rule processing. For this rule system, consider the following parameters: "M" represents the number of different object types and their metadata parameters in the rules; "U" represents the number of an end user's authentication and authorization parameters in the rules; and "N" represents the number of rules in the rule tree. In such a case, in order to determine the ACL to an object, the system performs on average N checks, i.e., it is a classic O (n) problem. In a sparsely populated system (i.e., large M), this processing time is of the order of milliseconds per object.

Disclosed processes use pre-computation of access control expressions based on each object's metadata independent of end user authentication and authorization in order to generate a Boolean expression.

The system stores the access control expressions (325). The access control expressions are stored against the respective objects as an extra property, for example as a property of each data object 220, in the tables described above, or otherwise. The access control expressions can be stored as Boolean expressions in a string representation.

The access control expressions can be computed during initial receipt, indexing, or generation of the hierarchical data structure, whether that is BOM structure or otherwise, when the tables above are created, or otherwise.

Note that the actual value true/false of individual access control expressions can be evaluated based on user credentials, however, a rule tree is no longer required and such access control expressions can be very large.

The system receives an access request for one or more structure lines from a user (330). This access request can be from any process acting on behalf of the user and using the user's credentials to access the structure lines, which can be BOM lines. The access request can be a read request, a write request, or otherwise.

The system grants or denies access to the structure lines based on the user's credentials and the access control expressions (335). This can include granting or denying access to each entire structure line, or can include granting or denying access to specific properties of each structure line.

As one example, consider that the system should allow access to a given object under the condition: (If Role is manager) OR (if group is not supported) OR (role is not supplier) OR (user nationality is US). This can be represented in a compact encoded notation as R(Manager)#g(support')#r(supplier)#[nationality=us] user where "U" means "Allow User," "u" means "Deny User," "G" means "Allow Group," "g" means "Deny Group," "R" means "Allow Role," and "r" means "Deny Role."

If, in this example, a supplier is the user trying to access the above object, evaluating the computed effective access control expression will deny access to the object and any BOM line including the object because of "r(supplier)."

According to disclosed embodiments, the system relies on the access control expressions for each object and end user credentials, including authentication and authorization information, avoiding the computation costs of evaluating the rule tree on each access. Instead, the runtime access control evaluation is reduced to evaluating a Boolean expression of the corresponding access control expression.

This method can be applied to both rule-based security models and ACL-based security models. When applied to the enterprise search problem space, disclosed embodiments allow securing search indexes built from data from multiple systems in an efficient manner which historically has been a challenging area for search engines.

According to disclosed embodiments, a process for granting or denying access to the structure lines based on the user's credentials and the access control expressions can be performed as described below.

For the list of structure lines in question, the system determines a list of all recipe objects for each line. These are the persistent data objects of interest, that is, the objects for which the system must find read access privilege values. This can be done by evaluating the list of access control expressions corresponding to each of the recipe objects. Note that the number of unique read expressions (determined by comparing hashes) is typically much smaller than the number of total recipe objects themselves.

The system can use a runtime cache to keep track of any already-evaluated access control expressions for the current session. This helps to avoid re-calculation.

The system can find all structure lines that have at least one un-privileged recipe object (that is, structure lines that have at least one object for which access was denied based on the access control expression and the user's credentials). All other lines are fully readable (access is permitted) and no longer need to be considered further.

For the remaining set of un-privileged lines, the system determines which structure line properties are not visible. To do so, for each persistent object for each structure line of interest (that is, only the structure lines with less than 100% of access—a small subset of structure lines) the system obtains the list of all properties affected by it. If a given property is in that list and is affected by an un-privileged recipe object, the system marks the property as un-readable. This can be done in a set-based manner and so returns all un-readable properties on all such lines of interest.

As described above, object access can be determined by evaluating the Boolean expression along with end user session information at runtime instead of re-evaluating the rules on each access.

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke 35 USC §112(f) unless the exact words "means for" are followed by a participle.

What is claimed is:

1. A method for product data management, the method performed by a data processing system and comprising:
    receiving a hierarchical data structure that includes a plurality of structure lines referencing persistent data objects, wherein the hierarchical data structure is a bill of material (BOM) structure and the structure lines are BOM lines;
    receiving metadata corresponding to persistent data objects referenced by the BOM lines;
    computing an access control expression corresponding to each persistent object referenced by the BOM lines according to the metadata, wherein the access control expressions are string-representation Boolean expressions;
    storing in at least one cache table the BOM lines and the access control expressions; and
    providing access to portions of the BOM lines to a user based on credentials associated with the user and the access control expressions in the cache table.

2. The method of claim 1, wherein the data processing system also receives an access request for one or more of the BOM lines from the user and the data processing system grants or denies access to the BOM lines based on the user's credentials and the access control expressions.

3. The method of claim 2, wherein granting or denying access to the BOM lines based on the user's credentials and the access control expressions includes granting or denying access to specific properties of each BOM line.

4. The method of claim 2, wherein the data processing system grants or denies access to the BOM lines based on the user's credentials and the access control expressions by evaluating the respective Boolean expressions for the BOM lines against the user's credentials.

5. The method of claim 1, wherein the at least one cache table includes a Line Table that includes a list of the BOM lines, a Recipe Table that includes a list of recipe objects for each BOM line, and an Access Control Expression Table that includes the access control expressions for the persistent data objects.

6. A data processing system comprising:
a processor; and
an accessible memory, the data processing system particularly configured to
receive a hierarchical data structure that includes a plurality of structure lines referencing persistent data objects, wherein the hierarchical data structure is a bill of material (BOM) structure and the structure lines are BOM lines;
receive metadata corresponding to persistent data objects referenced by the BOM lines;
compute an access control expression corresponding to each persistent object referenced by the BOM lines according to the metadata, wherein the access control expressions are string-representation Boolean expressions;
store in at least one cache table the BOM lines and the access control expressions; and
provide access to portions of the BOM lines to a user based on credentials associated with the user and the access control expressions in the cache table.

7. The data processing system of claim 6, wherein the data processing system also receives an access request for one or more of the BOM lines from the user and the data processing system grants or denies access to the BOM lines based on the user's credentials and the access control expressions.

8. The data processing system of claim 7, wherein granting or denying access to the BOM lines based on the user's credentials and the access control expressions includes granting or denying access to specific properties of each BOM line.

9. The data processing system of claim 7, wherein the data processing system grants or denies access to the BOM lines based on the user's credentials and the access control expressions by evaluating the respective Boolean expressions for the BOM lines against the user's credentials.

10. The data processing system of claim 6, wherein the at least one cache table includes a Line Table that includes a list of the BOM lines, a Recipe Table that includes a list of recipe objects for each BOM line, and an Access Control Expression Table that includes the access control expressions for the persistent data objects.

11. A non-transitory computer-readable medium encoded with executable instructions that, when executed, cause one or more data processing systems to:
receive a hierarchical data structure that includes a plurality of structure lines referencing persistent data objects, wherein the hierarchical data structure is a bill of material (BOM) structure and the structure lines are BOM lines;
receive metadata corresponding to persistent data objects referenced by the BOM lines;
compute an access control expression corresponding to each persistent object referenced by the BOM lines according to the metadata, wherein the access control expressions are string-representation Boolean expressions;
store in at least one cache table the BOM lines and the access control expressions; and
provide access to portions of the BOM lines to a user based on credentials associated with the user and the access control expressions in the cache table.

12. The computer-readable medium of claim 11, wherein the data processing system also receives an access request for one or more of the BOM lines from the user and the data processing system grants or denies access to the BOM lines based on the user's credentials and the access control expressions.

13. The computer-readable medium of claim 12, wherein granting or denying access to the BOM lines based on the user's credentials and the access control expressions includes granting or denying access to specific properties of each BOM line.

14. The computer-readable medium of claim 12, wherein the data processing system grants or denies access to the BOM lines based on the user's credentials and the access control expressions by evaluating the respective Boolean expressions for the BOM lines against the user's credentials.

15. The computer-readable medium of claim 11, wherein the at least one cache table includes a Line Table that includes a list of the BOM lines, a Recipe Table that includes a list of recipe objects for each BOM line, and an Access Control Expression Table that includes the access control expressions for the persistent data objects.

* * * * *